(12) United States Patent
Kasuga et al.

(10) Patent No.: US 6,278,221 B1
(45) Date of Patent: Aug. 21, 2001

(54) ULTRASONIC MOTOR AND ELECTRONIC APPARATUS WITH ULTRASONIC MOTOR

(75) Inventors: Masao Kasuga; Akihiro Iino; Makoto Suzuki, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/249,267

(22) Filed: Feb. 12, 1999

(30) Foreign Application Priority Data

Feb. 16, 1998 (JP) .................................................. 10-32649

(51) Int. Cl.[7] ........................................................ H02N 2/00
(52) U.S. Cl. ........................................................ 310/323.09
(58) Field of Search ........................ 310/323.04, 323.05, 310/323.08, 323.09

(56) References Cited

U.S. PATENT DOCUMENTS

| 5,313,132 | * | 5/1994 | Nakanishi | ....................... | 310/323.09 |
| 5,625,247 | * | 4/1997 | Watanabe et al. | ............. | 310/323.09 |

FOREIGN PATENT DOCUMENTS

| 6-98570 | * | 9/1992 | (JP) | ................................. | 310/323.09 |
| 61-18370 | * | 9/1992 | (JP) | ................................. | 310/323.05 |

\* cited by examiner

*Primary Examiner*—Thomas M. Dougherty
(74) *Attorney, Agent, or Firm*—Adams & Wilks (57) ABSTRACT

A small, efficient and stable ultrasonic motor is provided, wherein force is prevented from varying before and after assembly and can be adjusted after assembly without requiring troublesome operations. An electronic apparatus with such a ultrasonic motor is also provided. The ultrasonic motor has a force applying device for applying a force to a vibrating member to be vibrated and to a moving member placed in abutment against the vibrating member to cause a frictional force therebetween so that the moving member is driven by the frictional force. The force applying device comprises a main force applying device for applying a main force and a force adjusting elements for adjusting the force applied by the main force applying device. In one embodiment, the main force applying device is a leaf spring and the force applying elements are slits formed in the leaf spring and strips formed between the slits. Adjustment of the force applied by the leaf spring is performed by removing one or more of the strips.

14 Claims, 10 Drawing Sheets

ULTRASONIC MOTOR AND ELECTRONIC APPARATUS WITH ULTRASONIC MOTOR

BACKGROUND OF THE INVENTION

The present invention relates to an ultrasonic motor having a force applying means for applying a force to a vibrating member and moving member, and more particularly to an ultrasonic motor having a force applying means for applying a force to be adjusted before or after assembling the vibrating member, moving member and so on, and to an electronic apparatus with such a ultrasonic motor.

In the field of micro-motors, attention has recently been drawn to ultrasonic motors that utilize a piezoelectric effect provided by a piezoelectric element.

There is known, as one example of such an ultrasonic motor, a type that is provided with a support plate, a center shaft fixed to the support plate, a vibrating member fixed on the center shaft, a piezoelectric element joined to an underside of the vibrating member, a moving member placed in abutment against a projection provided on the vibrating member, and a force applying means placed in pressure contact with the moving member.

According to this art, the piezoelectric element is vibrated so that the vibration of the piezoelectric element causes the vibrating member to elastically vibrate. Through this elastic vibration, the projection of the vibrating member is brought into contact with the moving member, with a certain periodicity. Meanwhile, the force applying means applies a force to the moving member and the projection on the vibrating member to generate a frictional force between the moving member and the vibrating member, thus driving the moving member through the frictional force.

Figure 11A:
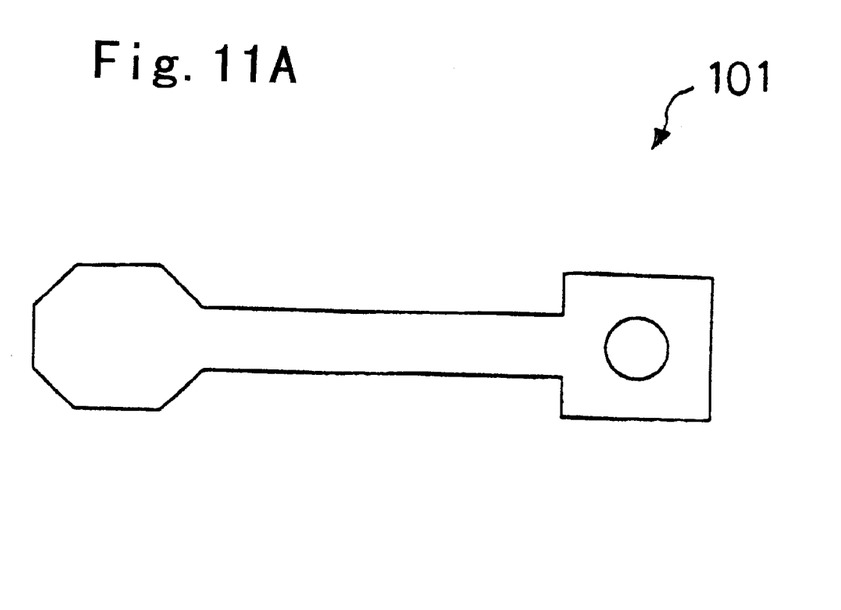
FIGS. 11A and 11B are explanatory views showing a plan structure of a force applying member of a ultrasonic motor of a conventional art.
Figure 11B:
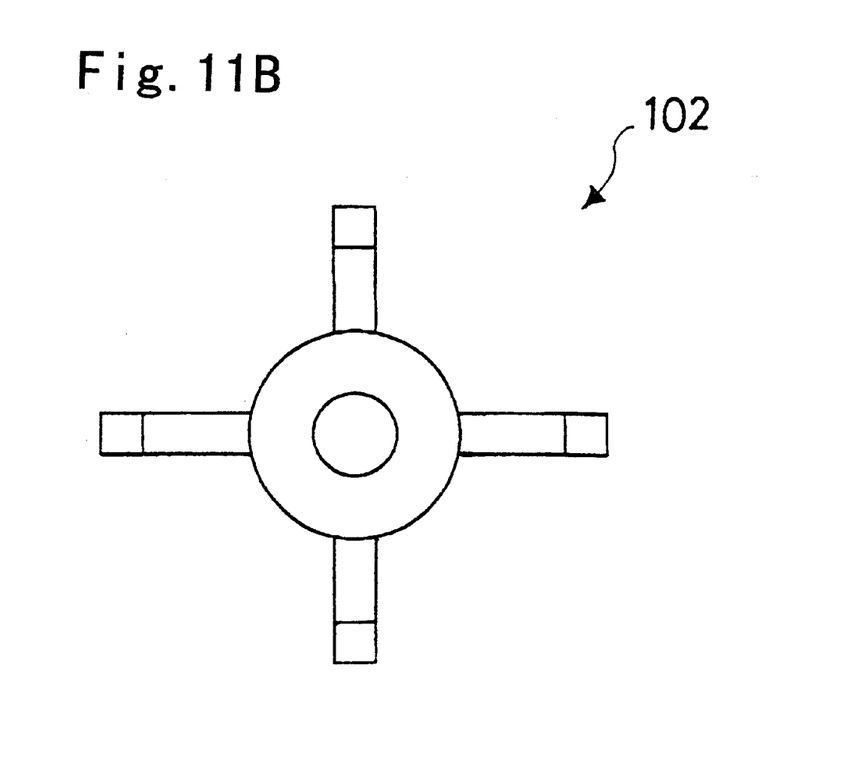

Here, it is known that the force applying means includes, in kind, a leaf spring 101 as shown in FIG. 11A or a dish-shaped spring 102 as shown in FIG. 11B, and one formed by a spacer for adjusting the force of the dish-shaped spring (see Japanese Patent Laying-open No H2-287281 and Japanese Patent Laying-open No S63-305770).

In the case of the leaf spring 101, however, there is encountered a variation in force due to a shape of the leaf spring, variation in thickness thereof, variation in thickness of parts such as the vibrating member and the moving member, and variation caused by assembling these parts. Such variation in force in turn causes change in the frictional force between the vibrating member and the moving member and also the drive force to the moving member, thus posing a problem of causing variation in individual characteristics of the ultrasonic motor.

On the other hand, where using the dish-shaped spring 102 and the spacer, the force can be adjusted by adjusting the variation in such parts as the dish-shaped spring, vibrating member and moving member, through controlling a spacer thickness. Nevertheless, the force adjustment still requires troublesome operations, such as combining parts due to thickness selection before assembling and disassembling for motor characteristic inspection after assembling, e.g., changing the number of spacers. Furthermore, the adjustment with spacers, even if there is slight difference in thickness, induces greater variation in force applied. Due to this, it is impossible to accurately adjust the force, resulting in such problems as increase in size and decrease in efficiency of the apparatus.

SUMMARY OF THE INVENTION

It is an object of the present invention to provide, in view of the above-stated problems, a small, efficient and stable ultrasonic motor in which prevention is made for variation in force before and after assembling its vibrating member, moving member and so on and adjustment of force is possible without requiring troublesome operations after the assembling, and to provide an electronic apparatus with such an ultrasonic motor.

Figure 1:
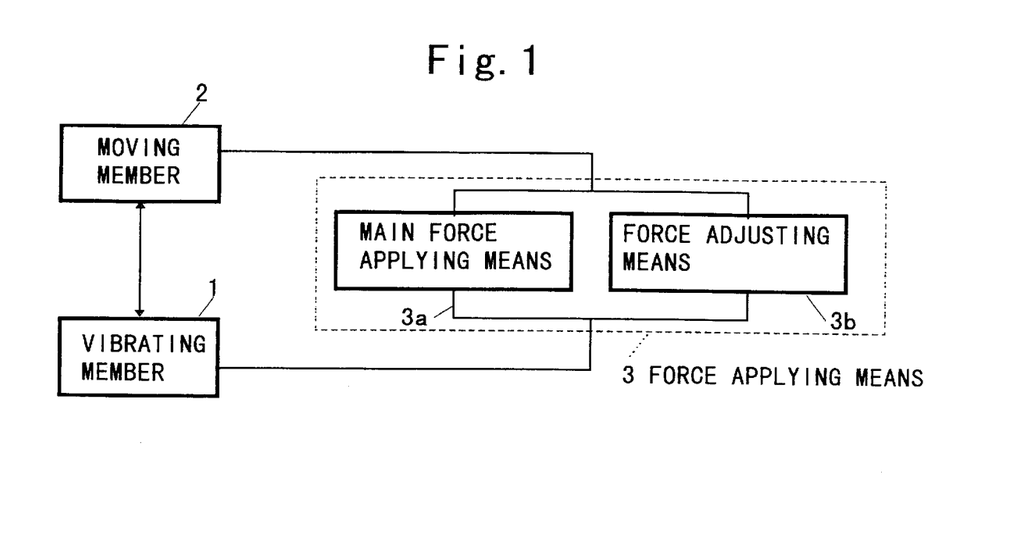
FIG. 1 is a block diagram showing a concept of the present invention.

FIG. 1 is a block diagram showing a concept of the present invention.

According to the present invention, an ultrasonic motor, has a force applying means 3 for applying a force to a vibrating member 1 to be vibrated as well as to a moving member 2 placed in abutment against the vibrating member 1 to cause a frictional force between them so that the moving member 2 is driven by the frictional force, wherein the force applying means 3 comprises: a main force applying means 3a for mainly applying a force; and a force adjusting means 3b for adjusting the force applied by the main force applying means 3a.

In the above means, the force applying means 3 includes any of a scheme employing an elastic member, a scheme applying a force by a weight member, and further a scheme applying a force by attraction and repelling due to a magnet or the like. Also, the elastic member includes a spring and rubber, and further the spring includes a leaf spring, a spring with radial arms, a coiled spring, and the like.

Figure 2:
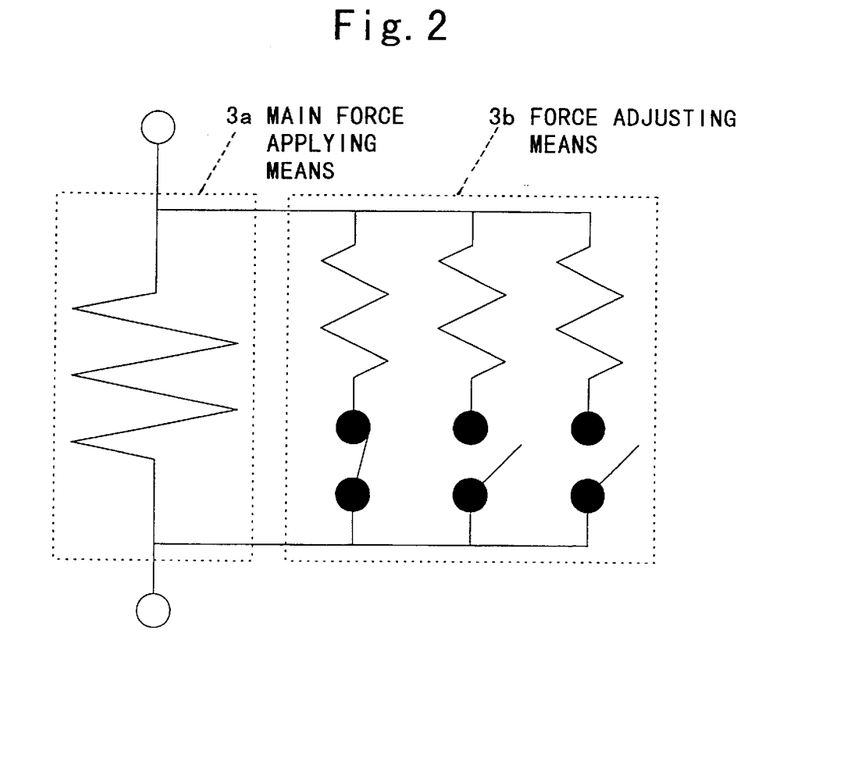
FIG. 2 is a diagram equivalently representing the principle of the present invention.

FIG. 2 is a diagram equivalently representing a principle of the present invention.

The force applying means 3 is replaced by a structure having, in parallel connection, the main force applying means 3a formed by a spring with a greater elastic constant of K1 and the force adjusting means 3b formed by three springs each having a smaller elastic constant of K2, Under a certain constant amount of deflection, the three springs of the force adjusting means 3b are connected or cut away to select a total elastic constant from among K1+3K2, K1+2K2, K1+K2 and K1, thereby adjusting the force.

According to the present invention, the force adjusting means 3b allows the force of the main force applying means 3a to be adjusted not only before assembling but also after the assembling. This accordingly prevents variation in the force due to variation in dimension of the vibrating member 1, the moving member 2 and the force applying means 3. Also, the vibrating member 1, the moving member 2 and the force applying means 3 become easy to control on dimensional accuracy.

Also, after assembling, the force is adjusted without requiring a disassembly work. Accordingly, an adjustment of the force after assembling becomes easy.

Also, after assembling, the force is adjusted with accuracy by connecting or cut away the force adjusting means 3b. This accordingly realizes a motor that is small in size, high in efficiency and stable.

The force applying means may be a leaf spring, and the force adjusting means having slits and strip portions between the slits formed in the leaf spring.

According to this structure, the force can adjusted by the slits before assembling, and after the assembling the strip portions between the slits are cut away or connected, thus conducting an adjustment with accuracy.

The force applying means may have radially extending arms, the main force applying means being main force applying arm portions which are among the arms and have a predetermined width, and the force adjusting means being force adjusting portion adjusting portions which are among the arms and narrower in width than main force applying arms.

According to this structure, the force of the main force applying arms can be adjusted by the force adjusting arms before assembling, and after the assembling part of the force adjusting arms is cut away or bent, thereby conducting an accurate adjustment of the force.

The force adjusting means may be worked so as to adjust the force after assembling the vibrating member, the moving member and the force applying means.

Here, the working is due to a method of cutting, bending, fusion or the like.

This structure allows the force adjusting means to be worked after assembling the vibrating member and the like, enabling accurate adjustment of the force.

The force applying means and the moving member may be formed in one body.

This structure makes it unnecessary to use a member for providing the force applying means due to making the force applying means and the moving member in one body. This accordingly simplifies the apparatus structure.

An electronic apparatus can be provided with the ultrasonic motor.

Here, the electronic apparatus includes an electronic timepiece, measuring instrument, camera, printer, printing machine, machine tool, robot, and movable device.

This structure can realize an electronic apparatus with a ultrasonic motor to which the present invention is applied.

DETAILED DESCRIPTION OF THE PREFERRED EMBODIMENTS

Referring now to FIG. 3 through FIG. 10, explanations will be made hereunder on the present invention in accordance with embodiments thereof.

Embodiment 1

Figure 3:
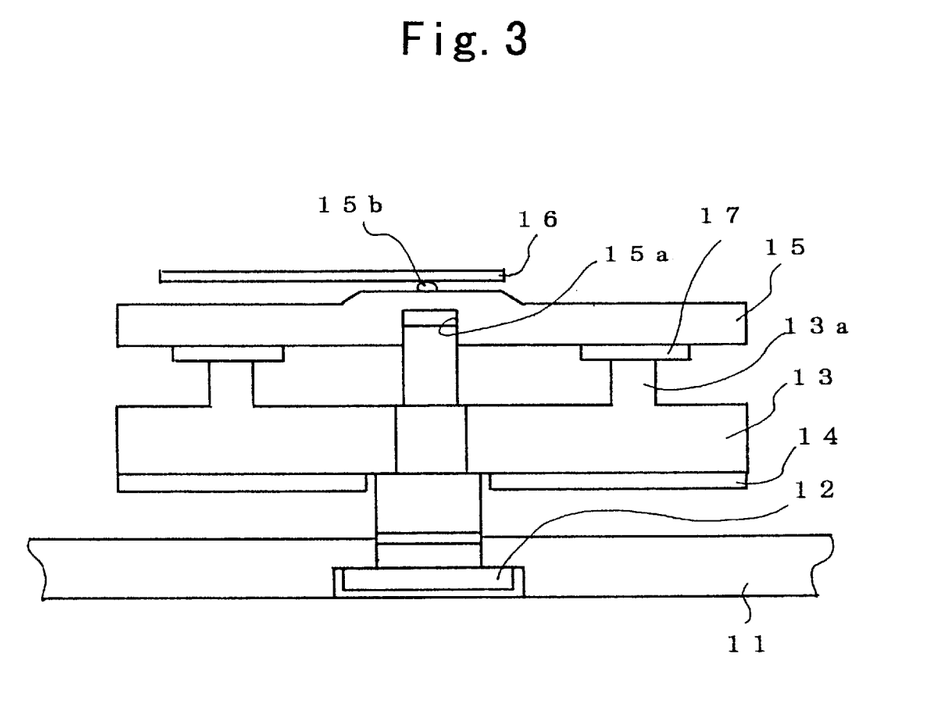
FIG. 3 is a view showing a sectional structure of a ultrasonic motor according to Embodiment 1 to which the present invention is applied.

FIG. 3 illustrates a structure in section of a ultrasonic motor according to Embodiment 1 to which the present invention is applied, while FIG. 4 is a structure in plan of a force applying spring 16 of the ultrasonic motor.

The present embodiment is provided with a support plate 11 for supporting the ultrasonic motor, a center shaft 12 having a base end rotatably fixed by the support plate 11, a vibrating member 13 fixed on an axial center of the center shaft 12, a piezoelectric element 14 joined to an underside of the vibrating member 13, a moving member 15 placed in abutment against projections 13a of the vibrating member 13, a force applying spring 16 as a force applying means of the invention that is in pressure contact with the moving member 15, and a friction plate 17 fixed on the underside of the moving member 15.

Here, the center shaft 12 is a columnar member formed of a rigid material, which fixingly supports the vibrating member 13 and also rotatably supports the moving member 15.

The vibrating member 13 is in a disc form that is formed of an elastic material, such as aluminum alloy, stainless steel and brass. The vibrating member 13 has columnar projections 13a provided, at equal intervals, in positions corresponding to divisional boundaries of a piezoelectric element 14 hereinafter referred to.

The piezoelectric element 14 is made of titanate zirconate, barium titanate, titanium compound, lithium niobate, lithium tantalate or the like, which is formed in a generally disc form. The piezoelectric element 14 is circumferentially divided into twelve equal fan-like portions so that two sets of polarized portions are provided by making divisional portions positioned every other one as one set polarized portion. The polarization should be made such that the polarized portions of each set are opposite in polarization to each other. Here, as for the direction of polarization, a positive direction was given by applying a positive electric field to a joining plane to the vibrator 13 while a reverse direction is by applying a negative electric field to the joining surface to the vibrating member 13.

The piezoelectric element 14 is formed, at its surface opposite to the joining surface, with electrode patterns by means of evaporation, sputtering, printing, CVD or the like into generally fan-like shapes corresponding to the respective divisional portions. Two sets of electrode patterns are formed by short circuiting between polarized portions of the sets. One electrode pattern is connected to a first lead while the other electrode pattern to a second lead. Meanwhile, the joining surface to the vibrating member 13 is entirely formed with an electrode. Vibration signals different in phase by 90 degrees are inputted respectively to the one electrode pattern and the other electrode pattern so that the polarized portions are vibrated with the phase shifted by 90 degrees thereby causing traveling waves in a circumferential direction of the vibrating member 13.

Note that, in the case of using a standing wave scheme, projections 13a are arranged every other one of the divisional portion boundaries, i.e., at respective intermediate points between the node and loop of three wavelengths of standing waves caused in the circumferential direction. When driving in a positive direction, a vibration signal is inputted to the one polarized portion to cause vibration thereby generating three wavelengths of standing waves in the circumferential direction of the vibrating member 13. Conversely, when driving in a reverse direction, a vibration signal in a same phase is inputted to the other polarized portion to cause vibration thereby generating a standing wave different in phase by 90 degrees in the vibrating member 13.

The moving member 15 is in a disc form using, for example, a rigid material, which has a recess bore 15a formed at a center in the underside for receiving the center shaft 12 and a pivot 15b formed on the top surface thereof.

Figure 4A:
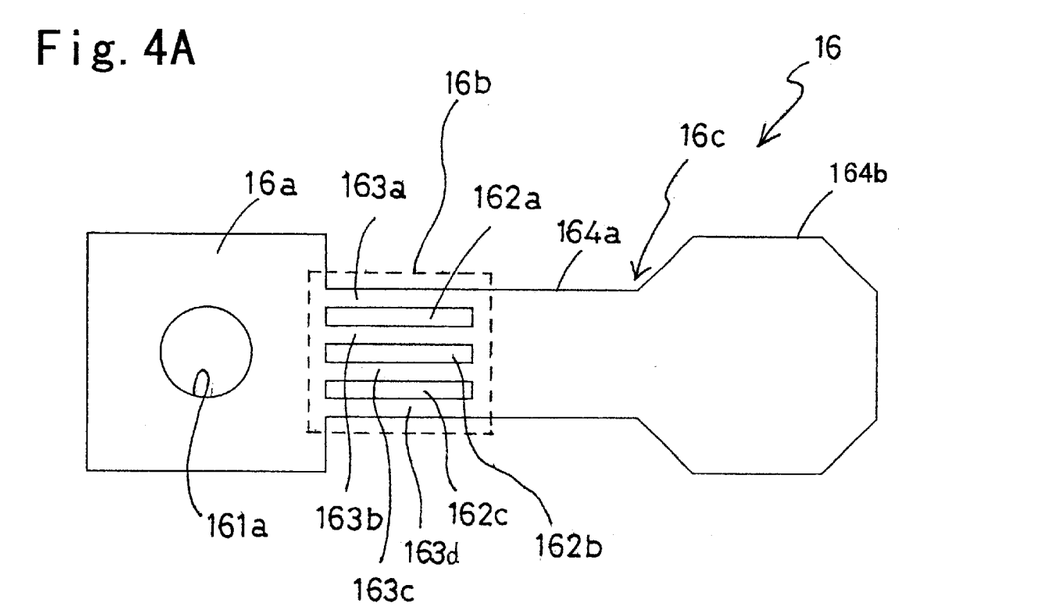
FIG. 4 shows a plan structure of a force applying spring in FIG. 3.

The force applying spring 16 as a force applying means of the invention is in a leaf spring form using, for example, stainless steel, spring steel or the like, as shown in FIG. 4A.

The force applying spring 16 is formed by a base portion 16a for fixation on a not-shown mount member, a force adjusting spring 16b as a force adjusting means of the invention formed continuous to the base portion 16a, and main force applying spring 16c as a main force applying means formed continuous to the force adjusting spring 16b.

Here, the base portion 16a is rectangular in form to have a circular mount bore 161a formed at a center of the rectangular portion.

The force adjusting spring 16b is formed with straight slits 162a, 162b, 162c extending in a lengthwise direction of the leaf spring, and strip portions 163a, 163b, 163c, 163d formed between the slits 162a, 162b, 162c.

The main force applying spring 16c is formed by a main portion 164a and a hexagonal portion 164a in a hexagon form.

The main force applying spring 16c is disposed to apply a force to the pivot 15b of the moving member 15. On the other hand, the force adjusting spring 16b serves to decrease the rigidity and hence the elastic constant of the force applying spring 16 due to the slits 162a, 162b, 162c to thereby adjust the force of the main force applying spring 16c.

Figure 4B:
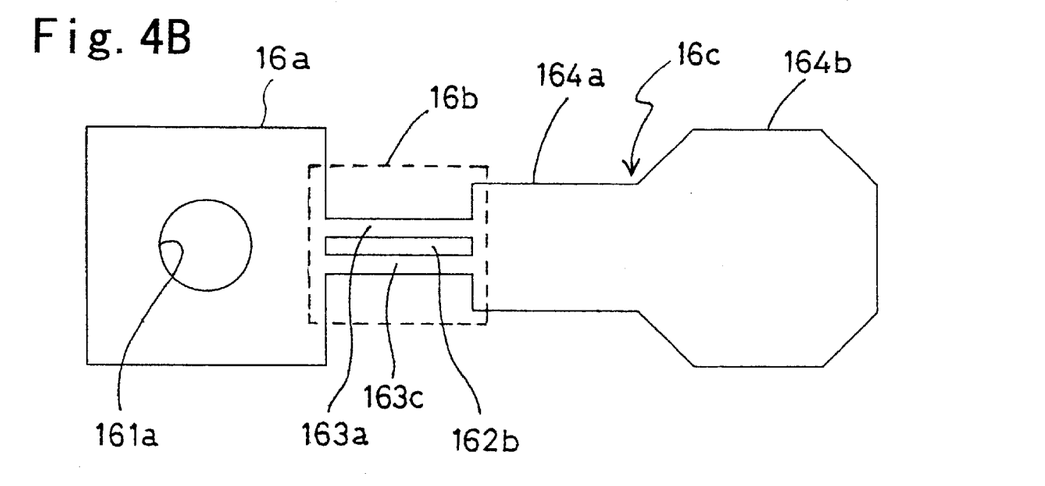
FIG. 4B is a view showing a plan structure worked after assembling.

After assembling the entire assembly, the strip portions 163a, 163d of the force adjusting spring 16b, for example, are further cut away by a laser cutter to further decrease the elastic constant of the leaf spring and finely adjust the force as shown in FIG. 4B.

The operation of the present embodiment will now be explained with reference to FIGS. 3 and 4.

First, vibration signals with phases different by 90 degrees are inputted to the one electrode pattern and the other electrode pattern of the piezoelectric element 14, to cause the polarized portions to vibrate with a phase difference of 90 degrees.

The vibrating member 13 joined to the piezoelectric element 14 is bent to vibrate causing waves traveling in the circumferential direction. The projection 13a of the vibrating member 13 undergoes an oval motion, and comes into contact with the moving member 15 during from an origin position to a top position in vertical direction of the oval movement.

Meanwhile, the force applying spring 16 is in pressure contact with and applies force to the pivot 15b of the moving body 15.

At this time, the main force applying spring 16c principally applies a force and is adjusted by the slit portions 162a, 162b, 162c of the force-adjusting spring 16b. Thus a proper force is applied to the moving member 15.

Due to this force, the moving member 15 is brought into contact with the projection 22a being positioned between the origin position and the top position in the oval motion. The moving member 15 is circumferentially applied by a frictional force and rotated in a predetermined direction.

In the case that the force is excessively great, the strip portions 163a, 163d of the force adjusting spring 16b may be cut away as shown in FIG. 4B.

At this time, the elastic constant of the force applying spring 16 is decreased by cutting the strip portions 163a, 163d, thus finely adjusting the force. This also eliminates the necessity of dissembling the assembly in an assembled once state.

Due to this the moving member 13 is allowed to rotate in a proper r.p.m. range providing a predetermined torque.

Note that if the force is excessively decreased by the above working, the strip portions 163a, 163d may be again connected.

Because in the present embodiment the force of the main force applying spring 16c is adjusted by the force adjusting spring 16b before or after assembling, it is possible to prevent variation in force due to variation in dimension of the vibrating member 13, moving member 15, force applying spring 16 and so on. The dimension control becomes easy to control for the vibrating member 13, moving member 15 and force applying spring 16.

Furthermore, because the adjustment of force is possible without requiring dissembling after assembling the assembly, the adjustment of force after assembling becomes easy to perform.

Furthermore, because highly accurate force adjustment is made by cutting away or connecting the strip portions 163a, 163b, 163c, 163d of the force adjusting spring 16b after assembling, it is possible to realize a motor which is small in size, efficient and stable.

FIG. 5 shows a plan structure of a modification of the force applying spring 16 according to the present embodiment.

Figure 5A:
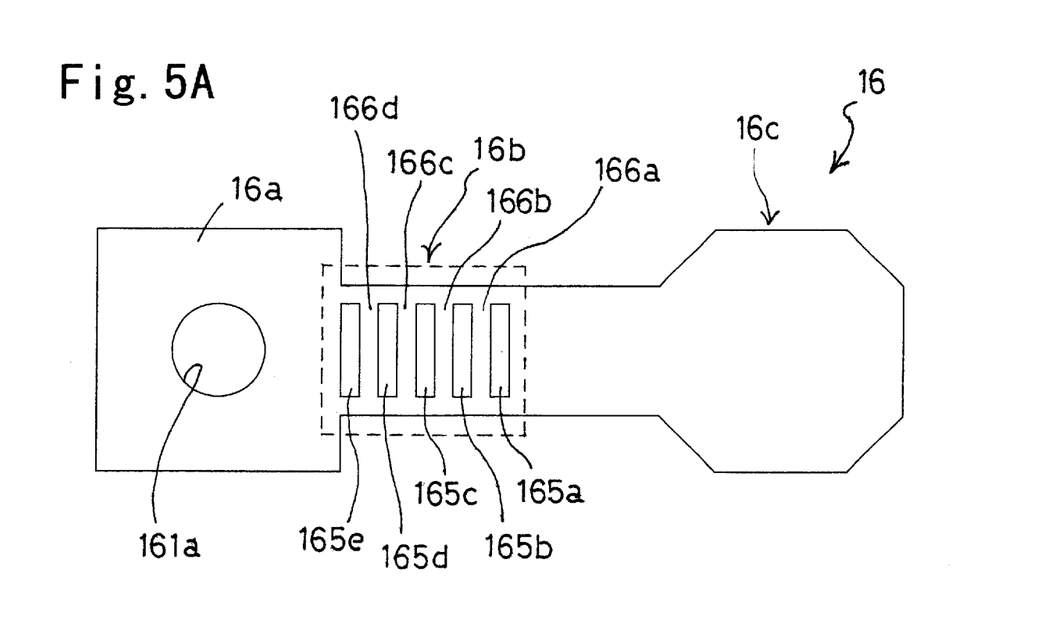
FIG. 5A shows a plan structure of a force applying spring of a modification to FIG. 4.

This force applying spring 16 has the force adjusting spring 16b formed with slits 165a, 165b, 165c, 165d, 165e extending in a width direction of the leaf spring to have strip portions 166a, 166b, 166c, 166d, 166e between the slits 165a, 165b, 165c, 165d, 165e.

Figure 5B:
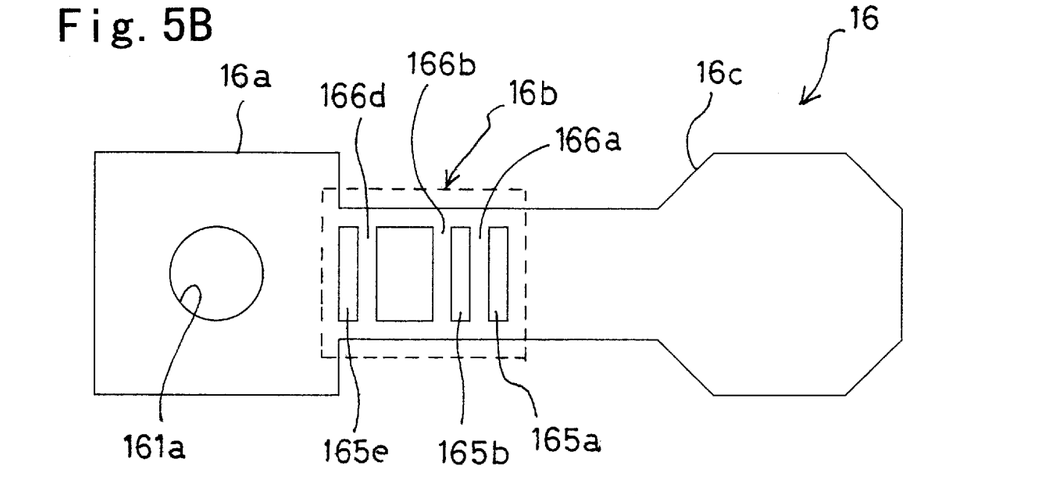
FIG. 5B is a view showing a plan structure worked after assembling.

In this structure, when adjusting the force after assembling the assembly, the force is finely adjusted, for example, by fusing and removing part of the strip portions 166c as shown in B in the same figure.

Embodiment 2

Figure 6:
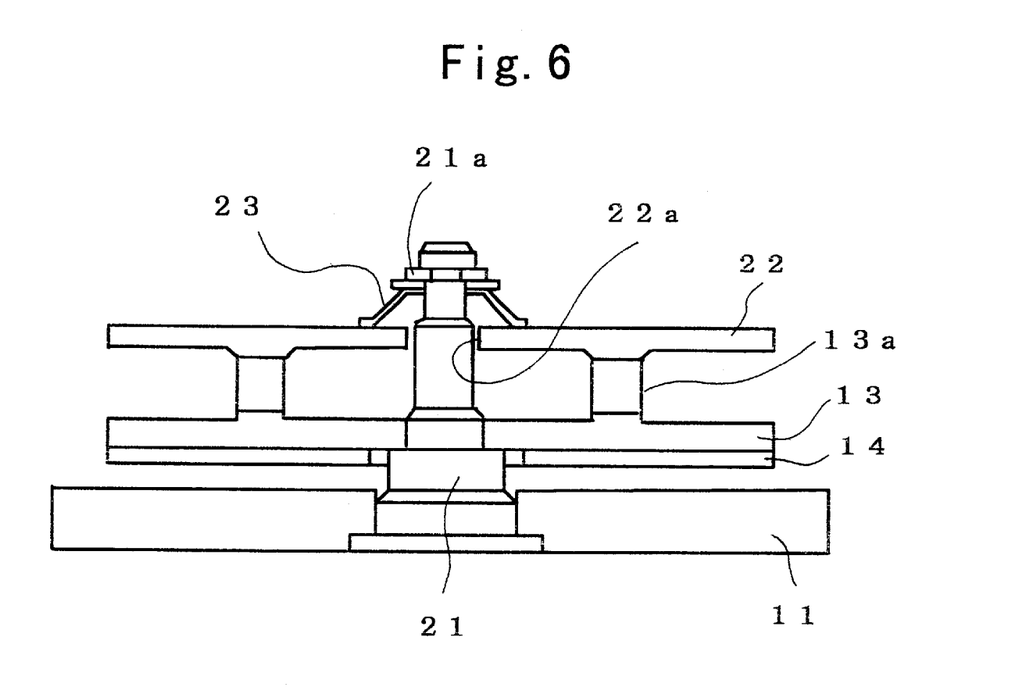
FIG. 6 is a view showing a sectional structure of a ultrasonic motor according to Embodiment 2 to which the present invention is applied.

FIG. 6 shows a structure in section of an ultrasonic motor according to Embodiment 2 to which the present embodiment is applied, while FIG. 7 is an illustrative view showing a structure in plan of a force applying spring 23 of the ultrasonic motor.

This ultrasonic motor is characterized by providing a center shaft 21 projecting above a moving member 22, and a force applying spring 23 supported by the center shaft 21 and pressure contacted with a top surface of the moving member 22, as shown in FIG. 6.

Note that the same structure as that of the Embodiment 1 is denoted by the same reference character to omit explanation.

Here, the center shaft 21 is a columnar member formed of a rigid material, and has a flange 21a laterally projecting at a top thereof. A force applying spring 23 is supported by this flange 21a. A moving member 22 is formed at a center portion with a insertion bore 22a through which the center shaft 21 is inserted.

Figure 7A:
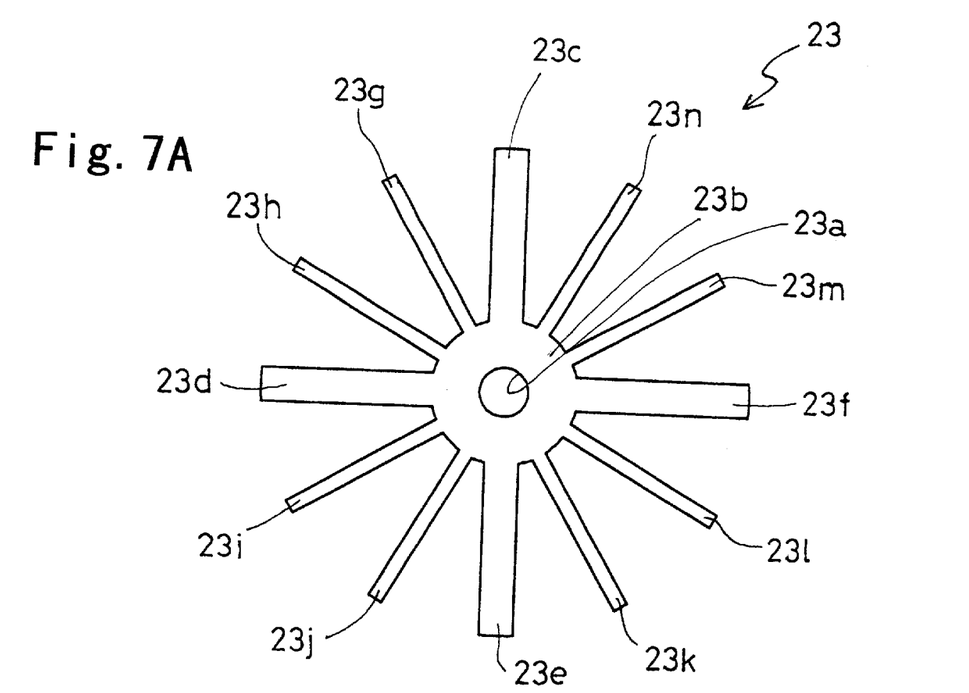
FIG. 7 shows a plan structure of a force applying spring in FIG. 6.

The force applying spring 23 is formed, as shown in FIG. 7A, by an annular portion 23b, main force applying arms 23c, 23d, 23e, 23f radially extending from an outer edge of the annular portion 23b, and force adjusting arms 23g, 23h, 23i, 23j, 23k, 23l, 23m, 23n formed between the main force applying arms 23c, 23d, 23e, 23f.

Specifically, the annular portion 23b has at a center an insertion bore 23a through which the center shaft 21 is inserted, and a bearing such as a not-shown ball bearing for free rotation with respect to the center shaft 21.

The main force applying arms 23c, 23d, 23e, 23f has a predetermined arm width to apply a main force to the moving member 22.

The force adjusting arms 23g, 23h, 23i, 23j, 23k, 23l, 23m, 23n is formed narrower in arm width than the main force applying arms 23c, 23d, 23e, 23f, in order to apply a smaller applying force to the moving member 22 than that by the main force applying arms 23c, 23d, 23e, 23f.

Figure 7B:
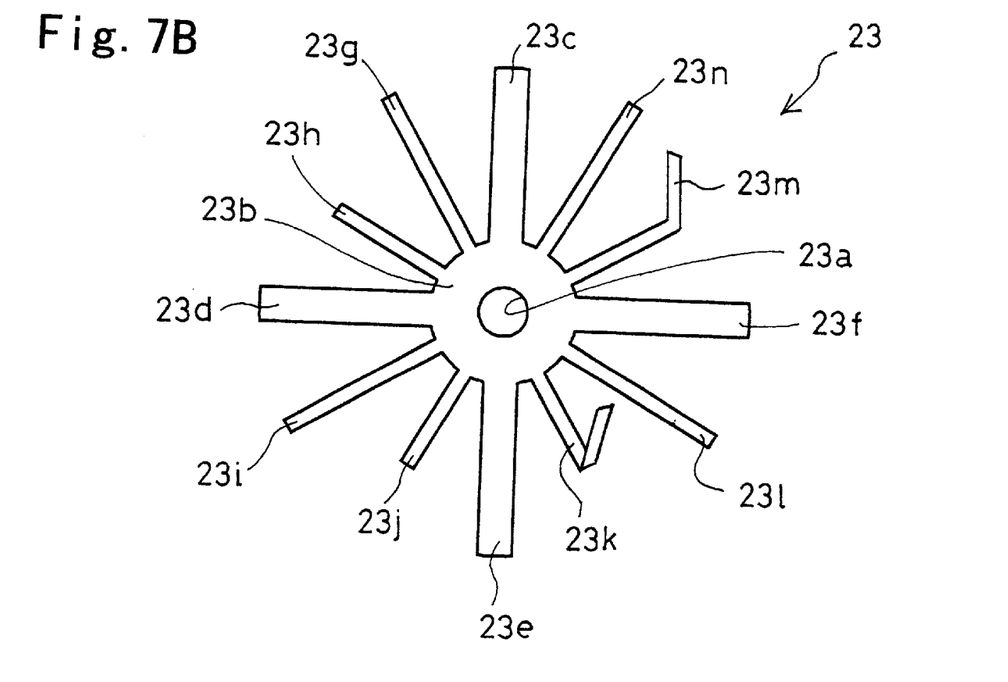
FIG. 7B is a view showing a plan structure worked after assembling.

The force adjusting arms 23g, 23h, 23i, 23j, 23k, 23l, 23m, 23n adjust toward increase the applying force of the main force applying arms 23c, 23d, 23e, 23f to the moving member 22.

Where the applying force is finely adjusted after assembling the assembly, the force adjusting arms 23h, 23j are separated from the moving member 22 by fusing or cutting away, as shown in B of the same figure. Also, the force adjusting arms 23k, 23m are bent upward and separated from the moving member 22. Accordingly, the force adjusting arms 23h, 23j, 23k, 23m do not apply a force to the moving member 22, thus finely adjusting the total force toward decrease.

According to the present embodiment, the force applied by the main force applying arms 23c, 23d, 23e, 23f to the moving member 22 is adjusted by the force adjusting arms 23g, 23h, 23i, 23j, 23k, 23l, 23m, 23n. Further, after assembling the assembly, the force adjusting arms 23h, 23j, 23k, 23m are formed to be separated from moving member 22 in order to finely adjust the force. Therefore, an effect is obtained similarly to Embodiment 1.

Embodiment 3

Figure 8:
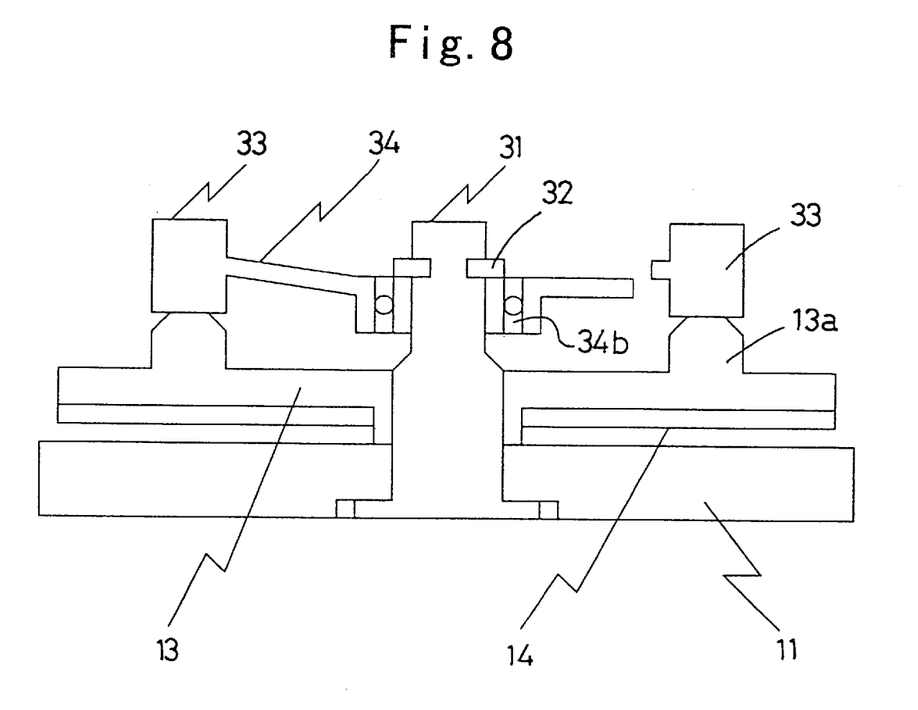
FIG. 8 is a view showing a sectional structure of a ultrasonic motor according to Embodiment 3 to which the present invention is applied.

FIG. 8 is a view showing a sectional structure of Embodiment 3 to which the present invention is applied to a ultrasonic motor, while FIG. 9 is a view showing a plan structure of a force applying spring 34 according to the ultrasonic motor.

This ultrasonic motor is structured, as shown in FIG. 8, by a center shaft 31 projecting above the moving member 22, a flange member 32 fixed at an upper portion of the center shaft 31, a moving member 33 abutted against the projection 13a of a vibrating member 13, and a force applying spring 34 formed integral with the moving member 33 and abutted against an underside of the flange member 32. Note that the similar structure to that of Embodiment 1 is denoted by the same reference character to omit explanation.

Figure 9A:
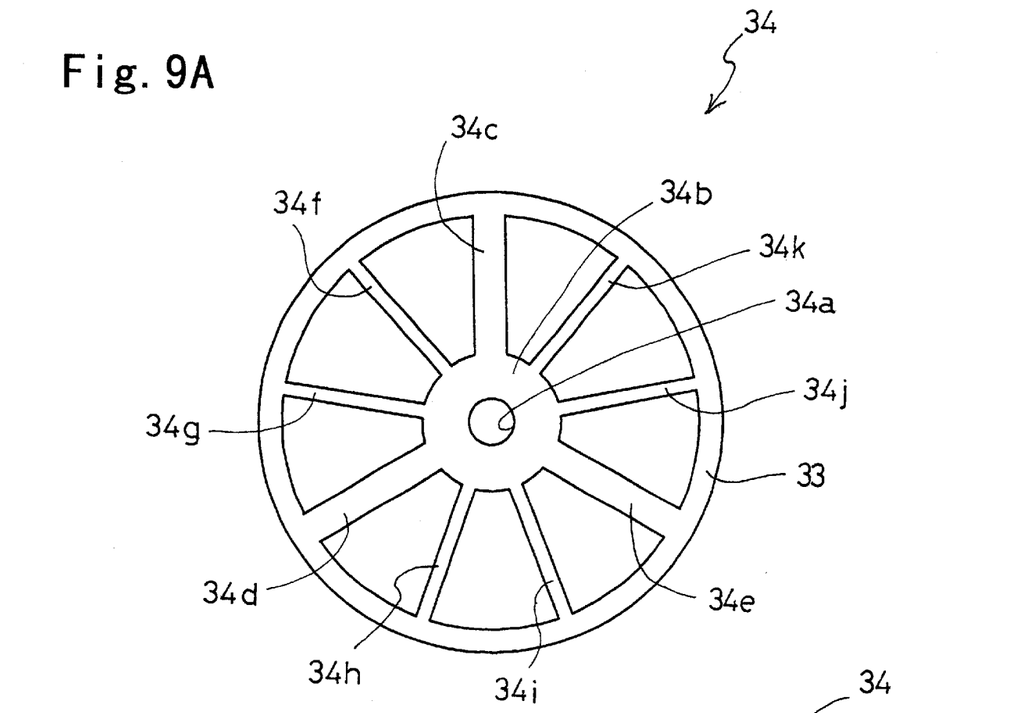
FIG. 9A shows a plan structure of a force applying spring in FIG. 8.

Here, the moving member 33 is annular as shown in FIG. 9A.

The force applying spring 34 is formed by an annular ball bearing 34b having at a center an insertion bore 34a through which the center shaft 31 is inserted, main force applying arms 34c, 34d, 34e radially extending in three directions from an outer edge of the ball bearing 34b, force adjusting arms 34f, 34g, 34h, 34i, 34j, 34k radially extending between the main force applying arms 34c, 34d, 34e.

Specifically, the main force applying arms 34c, 34d, 34e have a predetermined arm width to apply a main force to the moving member 33.

Also, the force adjusting arms 34f, 34g, 34h, 34i, 34j, 34k are formed narrower in arm width than the main force applying arms 34c, 34d, 34e in order to apply to the moving member 33 a smaller force than that of the main force applying arms 34c, 34d, 34e.

Figure 9B:
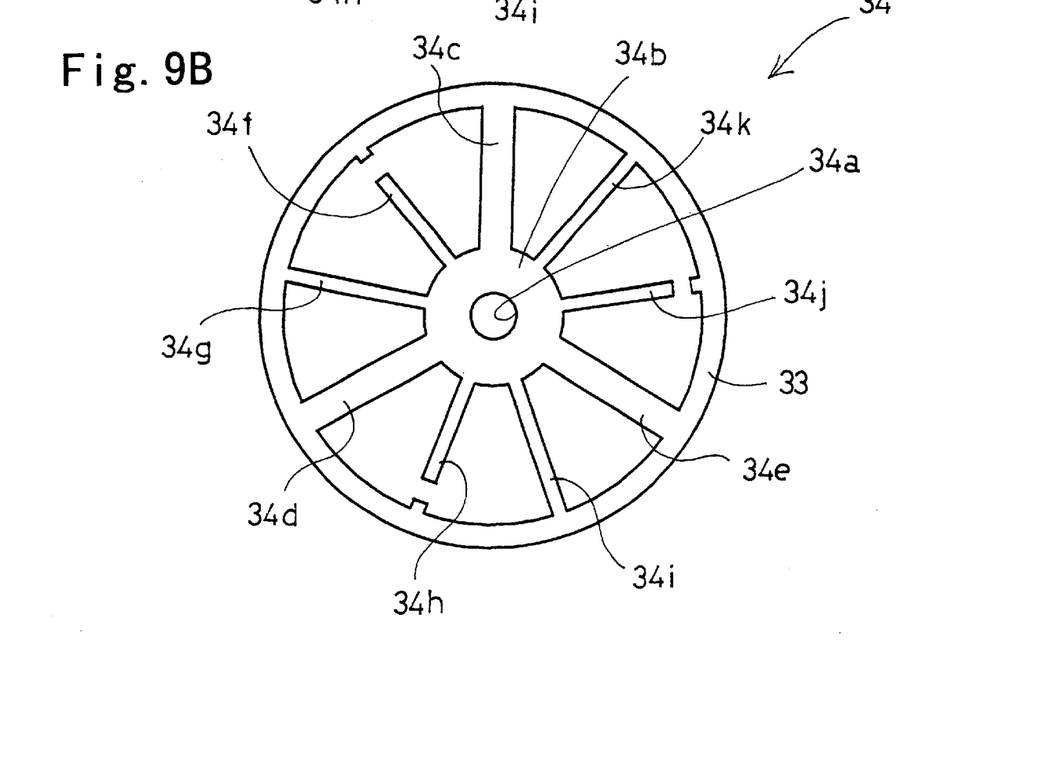
FIG. 9B is a view showing a plan structure worked after assembling.

The force adjusting arms 34f, 34g, 34h, 34i, 34j, 34k serves to adjust toward increase the applying force of the main force applying arms 34c, 34d, 34e to the moving member 33, as shown in B of the figure.

On the other had, where performing fine adjust of the applying force after assembling the assembly, the force adjusting arms 34f, 34h, 34j are fused or cut away for separation from the moving member 33. Accordingly, the force adjusting arms 34f, 34h, 34j separated from the moving member 33 do not apply a force to the moving member 33 thus finely adjust the total force toward decrease.

According to the present embodiment, the force applied to the moving member 33 by the main force applying arms 34c, 34d, 34e is adjusted by the force adjusting arms 34f, 34g, 34h, 34i, 34j, 34k. Further, after assembling the assembly, the force adjusting arms 34f, 34h, 34j are formed to be separated from the moving member 33 in order to finely adjust the force. Therefore, an effect is obtained similar to Embodiment 1.

Furthermore, because the number of members for providing the force applying spring is decreased by integrating the moving member 33 and the force applying spring 34, the assembly is structured simple.

Embodiment 4

Figure 10:
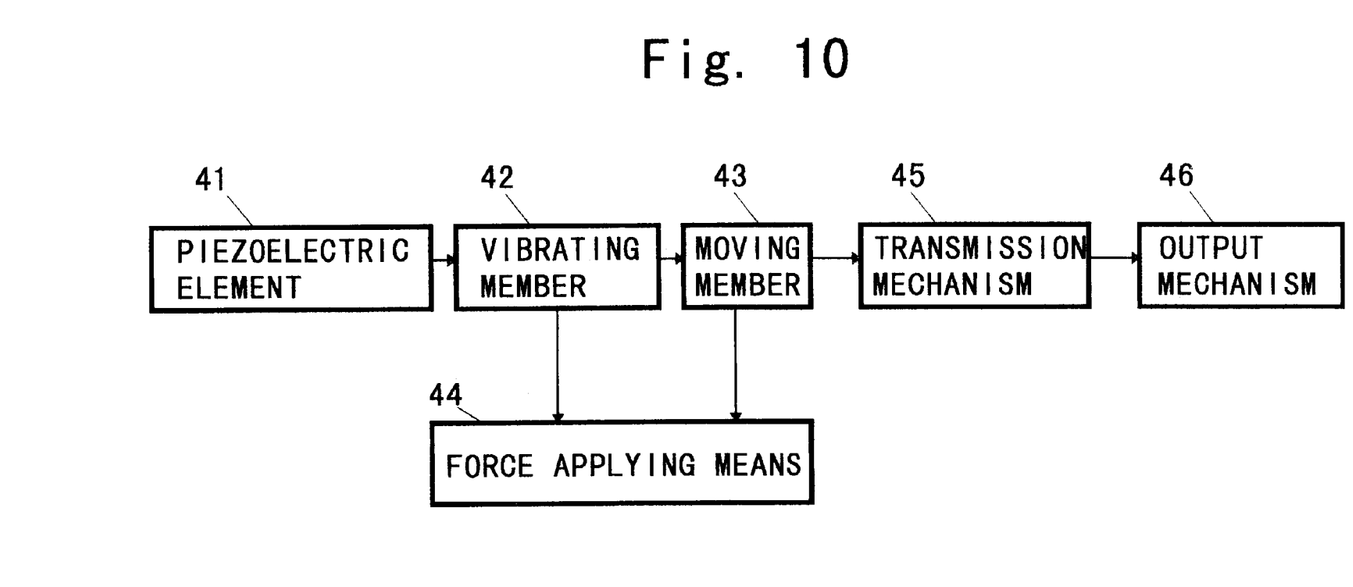
FIG. 10 is a block diagram of an electronic apparatus with a ultrasonic motor according to Embodiment 4 to which the present invention is applied.

FIG. 10 is a block diagram of an electric apparatus with a ultrasonic motor to which the ultrasonic motor according to the invention is applied.

The present apparatus is realized by the provision of a piezoelectric element 41 to be vibrated by a vibration signal, a vibrating member 42 to be elastically vibrated by the vibration of the piezoelectric element 41, a moving member 43 to be moved by the vibrating member 42, a force applying means 44 for applying a force to the moving member 43 and the vibrating member 42, a transmission mechanism 45 to be moved by interacting with the moving member 43, and an output mechanism 46 to be moved based on the operation of the transmission mechanism 45.

Here, the electronic apparatus with a ultrasonic motor is, for example, an electric timepiece, measuring instrument, camera, printer, printing machine, machine tool, robot, or movable apparatus.

The transmission mechanism 45 employs, for example, a transmission wheel such as a gear and frictional wheel.

The output mechanism 46 uses, for a camera, a shutter mechanism and lens drive mechanism, for a timepiece, a pointer drive mechanism and calendar drive mechanism, and, for a machine tool, a tool feed mechanism and workpiece feed mechanism.

Meanwhile, the moving member 43 may be provided with an output shaft through which torque is delivered so that a power transmission mechanism is provided to realize a drive mechanism by the ultrasonic motor itself without using the transmission mechanism 45 and the output mechanism 46.

According to the present invention, the force of the main force applying means is adjusted before or after assembling.

It is therefore possible to prevent variation in force due to variation in the vibrating member, moving member and force applying means and facilitate the control on the dimensional accuracy of the vibrating member, moving member, and the force applying means.

Also, the force can be adjusted after assembling the vibrating member and the like without requiring disassembly. This facilitates the after-assembling adjustment of the force.

Furthermore, since the force is accurately adjusted after assembling by cutting away or connecting the force adjusting means, a motor is realized which is small in size, highly efficient and stable.

What is claimed is:

1. An ultrasonic motor comprising: a vibrating member for undergoing vibration in response to an input signal; a moving member for undergoing movement in response to vibration of the vibrating member; and force applying means for applying a force to the vibrating member and to the moving member, the moving member being placed in abutment against the vibrating member to cause a frictional force therebetween so that the moving member is driven by the frictional force; wherein the force applying means comprises a main force applying means for applying a main force and a force adjusting means for adjusting the force applied by the main force applying means, and the force adjusting means comprises a portion of the main force applying means having removable portions for adjusting the force applied by the main force applying means.

2. An ultrasonic motor according to claim 1; wherein the force applying means is a leaf spring, and the force adjusting means comprises slits formed in the leaf spring and strip portions formed between the slits.

3. An ultrasonic motor according to claim 1, wherein the force applying means has radially extending arms, the main force applying means comprising main force applying ones of the arms that have a predetermined width, and the force adjusting means comprising force adjusting ones of the arms that are narrower in width than the main force applying arms.

4. An ultrasonic motor according to claim 1, wherein the force adjusting means may be worked so as to adjust the force after the vibrating member, the moving member and the force applying means are assembled.

5. An ultrasonic motor according to any one of claims 1 to 4, wherein said force applying means and said moving member are formed in one body.

6. In an electronic apparatus having an output mechanism for producing an output motion, an ultrasonic motor according to any one of claims 1 to 4.

7. An ultrasonic motor comprising: a vibrating member for undergoing vibration in response to an input signal; a moving member for undergoing movement in response to vibration of the vibrating member; and force applying means for applying a force to the vibrating member and to the moving member, the moving member being placed in abutment against the vibrating member to cause a frictional force therebetween so that the moving member is driven by the frictional force; wherein the force applying means comprises a main force applying means for applying a main force and force adjusting means for adjusting the force applied by the main force applying means, the force applying means is a leaf spring, and the force adjusting means comprises a plurality of slits formed in the leaf spring and strip portions formed between the slits.

8. An ultrasonic motor according to claim 7; wherein one or more of the strip portions may be removed from the force adjusting means to adjust the force after the vibrating member, the moving member and the force applying means have been assembled.

9. An ultrasonic motor according to claim 7; wherein the force applying means and the moving member are formed of a single member.

10. In an electronic apparatus having an output mechanism for producing an output motion, an ultrasonic motor according to claim 7.

11. An ultrasonic motor comprising: a vibrating member for undergoing vibration in response to an input signal; a moving member for undergoing movement in response to vibration of the vibrating member; and force applying means for applying a force to the vibrating member and to the moving member, the moving member being placed in abutment against the vibrating member to cause a frictional force therebetween so that the moving member is driven by the frictional force; wherein the force applying means comprises a main force applying means for applying a main force and force adjusting means for adjusting the force applied by the main force applying means, the force applying means has radially extending arms, the main force applying means comprising main force applying ones of the arms that have a predetermined width, and the force adjusting means comprising force adjusting ones of the arms that are narrower in width than the main force applying arms.

12. An ultrasonic motor according to claim 11; wherein one or more of the force adjusting arms may be removed from the force adjusting means to adjust the force after the vibrating member, the moving member and the force applying means have been assembled.

13. An ultrasonic motor according to claim 11; wherein the force applying means and the moving member are formed of a single member.

14. In an electronic apparatus having an output mechanism for producing an output motion, an ultrasonic motor according to claim 11.

* * * * *